United States Patent

Yamada et al.

[11] Patent Number: 6,042,969
[45] Date of Patent: *Mar. 28, 2000

[54] NEGATIVE ELECTRODE MATERIAL AND NON-AQUEOUS LIQUID ELECTROLYTE SECONDARY CELL EMPLOYING SAME

[75] Inventors: Shinichiro Yamada; Hiroshi Imoto, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,622

[22] Filed: Jul. 18, 1997

[30] Foreign Application Priority Data

Jul. 19, 1996 [JP] Japan ................................. 08-191265
Jun. 6, 1997 [JP] Japan ................................. 09-149389

[51] Int. Cl.⁷ ...................................................... H01M 4/58
[52] U.S. Cl. ........................................ 429/218.1; 429/232
[58] Field of Search ................................... 429/218, 324, 429/218.1, 232; 204/291, 292, 293

[56] References Cited

U.S. PATENT DOCUMENTS

| | | |
|---|---|---|
| 3,630,793 | 12/1971 | Christensen et al. .................. 148/188 |
| 4,048,395 | 9/1977 | Lai ........................................... 429/112 |
| 4,116,780 | 9/1978 | Sammells ................................. 204/2.1 |
| 5,395,711 | 3/1995 | Tahara et al. ........................... 429/197 |
| 5,458,995 | 10/1995 | Behl et al. .............................. 429/193 |
| 5,474,861 | 12/1995 | Bito et al. ............................... 429/194 |
| 5,556,721 | 9/1996 | Sasaki et al. ........................... 429/218 |
| 5,571,637 | 11/1996 | Idota ....................................... 429/218 |
| 5,631,106 | 5/1997 | Dahn et al. ............................. 429/218 |
| 5,698,340 | 12/1997 | Xue et al. ............................... 429/218 |
| 5,770,333 | 6/1998 | Saito et al. ............................. 429/194 |
| 5,824,280 | 10/1998 | Dahn et al. ............................. 423/326 |

Primary Examiner—Carol Chaney
Attorney, Agent, or Firm—Hill & Simpson

[57] ABSTRACT

A negative electrode material having high energy density per unit volume to realize high charging/discharging capacity, and a non-aqueous liquid electrolyte secondary cell employing the negative electrode material. The non-aqueous liquid electrolyte secondary cell includes a negative electrode mainly composed of silicon and capable of doping/undoping light metal ions, a positive electrode and a non-aqueous liquid electrolyte.

8 Claims, No Drawings

NEGATIVE ELECTRODE MATERIAL AND NON-AQUEOUS LIQUID ELECTROLYTE SECONDARY CELL EMPLOYING SAME

BACKGROUND OF THE INVENTION

1. Field of the Invention

This invention relates to a novel electrode material for a non-aqueous liquid electrolyte secondary cell employing the electrode material.

2. Description of the Related Art

In keeping up with recent progress in electronics technology, portable electronic equipments, such as a video tape recorder with a built-in camera, a portable telephone or a lap top computer, have been developed, and hence a strong demand has been raised towards development of a small-sized lightweight secondary cell of high energy density as a portable power source for using these equipments.

As a secondary cell, satisfying this demand, a non-aqueous liquid electrolyte secondary cell of high energy density employing light metals, such as lithium, sodium or aluminum, as active materials for negative electrode, and which is capable of developing a theoretical high voltage, is promising. In particular, the non-aqueous liquid electrolyte lithium secondary cell is easy to handle and capable of achieving a high output and a high energy density, so that researches and development in this field are proceeding briskly.

Meanwhile, if light metal, such as lithium metal, is directly used as a negative material for the non-aqueous liquid electrolyte secondary cell, the light metal tends to be precipitated as dendrites on the negative electrode in the course of charging, so that the current density is increased significantly at the distal end of the dendrite. The result is that the cyclic durability tends to be lowered due to decomposition of the non-aqueous liquid electrolyte or the dendrite is grown excessively to produce internal shorting in the cell.

For preventing such dendritic precipitation of light metals, these light metals are not used directly, but are used as doping materials for a carbonaceous material capable of doping and undoping ions of light metals so as to be used as a negative material. As the carbonaceous materials, cokes or organic high-molecular sintered materials are used in view of production cost and cyclic characteristics.

The energy density of the secondary cell having such negative electrode depends appreciably on the amount of doping/undoping of light metal ions in the carbonaceous material, that is charging/discharging capacity.

However, the amount of doping/undoping light metal ions in a conventional carbonaceous material cannot be said to be sufficient, and hence development of a novel negative electrode material having a higher charging/discharging capacity has been desired.

The carbonaceous material, such as cokes or organic high-molecular materials, are produced using fossil resources, such as cal or petroleum. From the viewpoint of maintaining or improving earth environments, use of such materials is not wholly desirable, such that a novel negative electrode material to take the place of the carbonaceous material has strongly been desired.

SUMMARY OF THE INVENTION

It is therefore an object of the present invention to provide a novel negative electrode material having a high charging/discharging capacity as a negative electrode of a non-aqueous liquid electrolyte secondary cell, and a non-aqueous liquid electrolyte secondary cell employing this novel negative electrode material.

The present inventors have conducted perseverant researches for accomplishing the above object, and have found that a compound mainly composed of silicon can prove to be a negative electrode material having a high charging/discharging capacity.

The negative electrode material according to the present invention is mainly composed of silicon and capable of doping/undoping light metal ions.

This negative electrode material may be composed of silicon alone or may also be an silicon-containing silicon compound.

If the negative electrode material is not electrically conductive, it may be rendered electrically conductive by doping of impurities. The impurities may be of the n-type or of the p-type.

The non-aqueous liquid electrolyte secondary cell according to the present invention includes a negative electrode mainly composed of silicon and capable of doping/undoping light metal ions, a positive electrode and a non-aqueous liquid electrolyte.

The material for the negative electrode may be composed of silicon alone or may also be an silicon-containing silicon compound.

If the negative electrode material is not electrically conductive, it may be rendered electrically conductive by doping of impurities. The impurities may be of the n-type or of the p-type.

The negative electrode material, mainly composed of silicon, is higher in density than the carbonaceous material, as a conventional electrode material, and can dope and undope a large quantity of light metals, functioning as an active material for the negative electrode, in a inter-layer spacing or micro-sized spacing of the silicon compound. Thus, with the non-aqueous liquid electrolyte secondary cell employing this negative electrode material, the charging/discharging capacity is increased, such that an extremely high energy density per unit volume can be achieved.

DESCRIPTION OF THE PREFERRED EMBODIMENTS

The present invention will be explained in detail.

The negative electrode material according to the present invention is mainly composed of silicon and capable of doping/undoping light metals, such as lithium, that can prove to be an active material for a negative electrode of a non-aqueous liquid electrolyte secondary cell.

This negative electrode material may be silicon alone, carbide, cyanides, nitrides, oxides, borides, boroxides, oxynitrides of silicon, alloys of silicon with typical elements, such as alkali metals or alkali earth metals, alloys of silicon with transition metals, and alloys or compounds of three or more components comprised of silicon with the above elements and metals. The constituent materials of the negative electrode materials in the present invention may also contain halogen elements.

Although there is no limitation to the chemical structure of the negative electrode material, it may be enumerated by a layered structure or a three-dimensional meshed structure composed of silicon or a 6- or 4-coordinate skeletonic structure.

The negative electrode material may be plate-shaped or powdered and may be of a fine porous structure as a micro-sized structure.

Examples of silicon compounds include $Si$, $SiO$, $SiO_2$, $SiC$, $SiB_4$, $SiB6$, $Si_3N_4$, $CaSi_2$, $CoSi_2$, $CrSi_2$, $Cu_5Si$, $FeSi_2$, $Mg2Si$, $MnSi_2$, $MoSi_2$, $NbSi_2$, $NiSi_2$, $TaSi_2$, $TiSi_2$, $VSi_2$, $WSi_2$ and $ZnSi_2$. As per se may also be used.

The negative electrode material according to the present invention can be obtained by mixing or heating, mixing and fusing the above-mentioned silicon compounds alone or in combination.

The above-described negative electrode material may be used for a negative electrode of a non-aqueous liquid electrolyte secondary cell. In this case, the negative electrode material is previously doped with light metals. These light metals may be enumerated by lithium, sodium or aluminum. In particular, lithium is preferred in view of cell output and energy density.

If the above-mentioned negative electrode is not electrically conductive, or low in electrical conductivity, the negative electrode material is preferably doped with impurities. For example, n-type or p-type impurities may be used for doping so that the negative electrode material exhibits n-type or p-type electrical conductivity. The n-type impurities may be enumerated by pentavalent elements, such as phosphorus. The p-type impurities may be enumerated by trivalent elements, such as boron. The doping amount of the impurities is preferably $7 \times 10^{18}$ to $1 \times 10^{19}$ atoms/cm$^3$ (300K).

If the above-mentioned negative electrode is not electrically conductive, or low in electrical conductivity, electrically conductive metals or carbon may be added as an electrically conductive agent along with a binder in forming a negative electrode from a negative electrode material for assuring electrical conductivity of the silicon compounds. The binder may be of any known type.

If an silicon compound having a large capacity loss (charging capacity—discharging capacity) is used, a light metal as an active material, such as lithium, may be contained in the silicon compound.

The negative electrode material, mainly composed of silicon, is higher in density than the carbonaceous material, as a conventional electrode material, and can dope and undope a large quantity of light metals, which function as an active material for the negative electrode, in a inter-layer spacing or micro-sized spacing of the silicon compound. Thus, with the non-aqueous liquid electrolyte secondary cell employing such negative electrode material, the energy density per unit volume can be increased significantly as compared with the conventional cell, thus realizing a high charging/discharging capacity.

Meanwhile, if the non-aqueous liquid electrolyte secondary cell is constituted using such negative electrode material, metal oxides, metal sulfides or specified polymers may be used as an active material for the positive electrode depending on the type of the cell.

For example, for forming a non-aqueous liquid electrolyte secondary cell, lithium-free metal sulfides or metal oxides, such as $TiS_2$, $MoS_2$, $NbSe_2$ or $V_2O_5$, or lithium compound oxides, mainly composed of $Li_xMO_2$, where M is one or more transition metal, usually with $0.05 \leq X \leq 1.10$, may be used as an active material for the positive electrode. As the transition metal M of the lithium compound oxides, Co, Ni and Mn are preferred. Illustrative examples of the lithium complex oxides include those containing nickel, cobalt and manganese, such as $LiCoO_2$, $LiNiO_2$ and $LiMn_2O_4$.

These lithium compound oxides may be used in conjunction with the above-mentioned negative electrode and a suitable electrolyte liquid for producing a cell capable of developing a high voltage and hence proves to be an active material for the positive electrode superior in energy density. These lithium compound oxides may be prepared by mixing and pulverizing carbonates, nitrates, oxides or hydroxides of lithium, carbonates, nitrates, oxides or hydroxides of cobalt, manganese or nickel, in a desired mixing ratio, and by firing the powdered mixture in an oxygen atmosphere in a temperature range of 400 to 1000° C.

The organic solvents of the non-aqueous liquid electrolyte of the non-aqueous liquid electrolyte secondary cell may be enumerated by propylene carbonate, ethylene carbonate, diethyl carbonate, methyl ethyl carbonate, 1,2-dimethoxyethane, 1,2-diethoxy ethane, γ-butyrolactone, tetrahydrofuran, 1,3-dioxolane, dipropyl carbonate, diethyl ether, sulforane, acetonitrile, propylnitrile, anisole, acetic acid esters, and propionic acid esters. Two or more of the organic solvents may be used in mixture.

As electrolytes dissolved in an organic solvent of a non-aqueous liquid electrolyte, salts of light metals, such as lithium, sodium or aluminum, may be selected and used depending on the type of the cell employing the non-aqueous liquid electrolyte. For example, in constructing the non-aqueous liquid electrolyte secondary cell, lithium salts, such as $LiClO_4$, $LiAsF_6$, $LiPF_6$, $LiBF_4$, $LiCF_3SO_3$ or $LiN(CF_3SO_2)_2$ may be used.

There is no limitation to the shape of the non-aqueous liquid electrolyte secondary cell, which may be cylindrical, square-shaped, coin-shaped or button-shaped. If the cell is of the closed type, a protecting device may preferably be used for interrupting the current responsive to the rise in the internal voltage of the cell in case of abnormalities, such as excess charging.

EXAMPLES

The present invention is explained in detail with reference to Examples.

Example 1

Single-crystal silicon as a negative electrode material was pulverized in a mortar and classified by a mesh screen to collect powders below 38 μm in diameter. These powders were heated in an argon atmosphere at a temperature raising rate of 30° C./minute to an ultimate temperature of 150° C. which was maintained for one hour. This removed water adsorbed on the surface area. The silicon powders were cooled to ambient temperature.

Immediately after cooling, 90 wt % of the silicon powders, 10 wt % of polyvinylidene fluoride and dimethyl formaldehyde as solvent were mixed together homogeneously. 10 parts by weight of gold powders as electrically conductive agent were added and dried for adjusting the negative electrode mixture. 39 mg of the negative electrode mixture and a nickel mesh as a current collector, with a nickel fiber diameter of 20 μm, were used for molding a pellet 15.5 mm in diameter to produce a negative electrode.

The negative electrode of silicon, lithium metal as a counter-electrode, a porous film of polypropylene, as a separator, and a non-aqueous liquid electrolyte composed of lithium perchlorate dissolved in a 1:1 volume ratio mixed solvent of propylene carbonate and dimethoxyethane, in a ratio of 1 mol/lit, were used to produce a coin-shaped test cell 20 mm in diameter and 2.5 mm in thickness.

Example 2

A test cell was prepared in the same way as in Example 1 except that single-crystal silicon was previously doped with boron (p-type) for being thereby rendered electrically conductive, and was dried sufficiently so as to be used as a negative electrode.

Example 3

A test cell was prepared in the same way as in Example 1 except that single-crystal silicon, previously doped with phosphorus (n-type) for being thereby rendered electrically conductive, and dried sufficiently, was used as a negative electrode.

Comparative Example 1

A test cell was prepared in the same way as in Example 1 except that pitch coke as a typical carbon graphitizable was used for a negative electrode.

Comparative Example 2

A test cell was prepared in the same way as in Example 1 except that fired phenolic resin coal (obtained on firing at 1000° C. under an inert gas atmosphere) as a typical non-graphitizable carbon was used for a negative electrode.

Comparative Example 3

A test cell was prepared in the same way as in Example 1 except that natural graphite as a typical carbon of high graphite crystallinity was used for a negative electrode.

Negative Electrode Capacity Test

The following capacity test was conducted on the test cells produced in the Examples and Comparative Examples.

First, the test cells were charged at a constant current of 1 mA (current of 0.53 mA/cm$^2$) up to the lithium potential. After charging, the test cells were allowed to stand for 120 minutes and discharged at 1 mA. The discharging was terminated at a time point the test cell voltage exceeded 1.5 V in the current conducting state after start of charging.

The discharging capacity was divided by the weight of silicon or carbon in the negative electrode and the resulting quotient was used as the charging/discharging capacity of the negative electrode. The results are shown in Table 1.

The charging and discharging denote the process of lithium doping of the negative electrode and the process of lithium undoping of the negative electrode, respectively. Therefore, the test cell voltage is lowered and raised with charging and discharging, respectively.

As may be seen from Table 1, the test cells of the Examples employing single-crystal silicon as the negative electrode exhibits a negative electrode capacity higher than in the Comparative Examples employing the carbonaceous material for the negative electrode.

TABLE 1

|  | negative electrode materials | discharging capacity (mAh/g) |
|---|---|---|
| Ex. 1 | single-crystal silicon (admixed with gold powders) | 407 |
| Ex. 2 | single-crystal silicon (doped with boron) | 453 |
| Ex. 3 | single-crystal silicon (doped with phosphorus) | 447 |
| Comp. Ex. 1 | graphatizable carbon (pitch coke) | 300 |
| Comp. Ex. 2 | non-graphatizable carbon (phenol fired coke) | 350 |
| Comp. Ex. 3 | graphite (natural graphite) | 370 |

The charging and discharging denote the process of lithium doping of the negative electrode and the process of lithium undoping of the negative electrode, respectively. Therefore, the test cell voltage is lowered and raised with charging and discharging, respectively.

As may be seen from Table 1, the test cells of the Examples employing single-crystal silicon as the negative electrode exhibits a negative electrode capacity higher than in the Comparative Examples employing the carbonaceous material for the negative electrode.

Thus it is seen that the test cells of the Examples employing single crystal silicon for the negative electrodes exhibit the negative electrode capacity higher than that of the Comparative Examples employing the carbonaceous material for the negative electrode. From this it is seen that the negative electrode material mainly composed of silicon exhibits energy density per unit volume higher than that of the conventional carbonaceous negative electrode material thus exhibiting high charging/discharging capacity.

What is claimed is:

1. A negative electrode material comprising a silicon compound and a doping element to render the material electrically conductive, wherein the material is capable of intercalating and deintercalating light metal ions and the doping element selected from the group consisting of n-type and p-type is included in an amount ranging from $7\times10^{18}$ to $1\times10^{19}$ atoms/cm$^3$.

2. A non-aqueous liquid electrolyte secondary cell comprising:

a negative electrode comprising a silicon compound and a doping element to render the material electrically conductive, wherein the negative electrode is capable of intercalating and deintercalating light metal ions and the doping element selected from the group consisting of n-type and p-type is included in an amount ranging from $7\times_{18}$ to $1\times10^{19}$ atoms/cm$^3$;

a positive electrode; and a non-aqueous liquid electrolyte.

3. The non-aqueous liquid electrolyte secondary cell as claimed in claim 2 wherein the positive electrode comprises a lithium-containing compound.

4. A non-aqueous liquid electrolyte secondary cell comprising:

a negative electrode comprising a silicon compound selected from the group consisting of SiC, Si$_3$N$_4$, CrSi$_2$, Cu$_5$Si, FeSi$_2$, MnSi$_2$, NbSi$_2$, TaSi$_2$, VSi$_2$, WSi$_2$ and ZnSi$_2$, the silicon compound capable of intercalating and deintercalating light metal ions;

a positive electrode; and a non-aqueous liquid electrolyte.

5. The non-aqueous liquid electrolyte secondary cell as claimed in claim 4 further comprising a doping element to render the negative electrode electrically conductive.

6. The non-aqueous liquid electrolyte secondary cell as claimed in claim 5 wherein the doping element is of the n-type.

7. The non-aqueous liquid electrolyte secondary cell as claimed in claim 5 wherein the doping element is of the p-type.

8. The non-aqueous liquid electrolyte secondary cell as claimed in claim 4 wherein the positive electrode comprises a lithium-containing compound.

* * * * *